(12) United States Patent
Ko

(10) Patent No.: US 7,337,997 B2
(45) Date of Patent: Mar. 4, 2008

(54) FOOD SLICING DEVICE

(75) Inventor: Kon Yi Ko, Chifufayuen (HK)

(73) Assignee: Merry Chance Industries, Ltd., Kwai Chung, N.T. (HK)

( * ) Notice: Subject to any disclaimer, the term of this patent is extended or adjusted under 35 U.S.C. 154(b) by 277 days.

(21) Appl. No.: 11/084,881

(22) Filed: Mar. 21, 2005

(65) Prior Publication Data

US 2006/0208114 A1  Sep. 21, 2006

(51) Int. Cl.
*B02C 17/02* (2006.01)

(52) U.S. Cl. .............. 241/93; 241/168; 241/169.1

(58) Field of Classification Search ............ 241/168, 241/169, 93, 169.3, 169.1, 169.2
See application file for complete search history.

(56) References Cited

U.S. PATENT DOCUMENTS

| | | | |
|---|---|---|---|
| 2,271,175 A | | 1/1942 | Mantelet |
| 3,912,176 A | | 10/1975 | Mantelet |
| 4,081,145 A | * | 3/1978 | Moe et al. ............ 241/93 |
| 4,247,054 A | * | 1/1981 | Schulein et al. ......... 241/95 |
| D276,202 S | | 11/1984 | Shun |
| 4,856,718 A | | 8/1989 | Gabet et al. |
| 5,562,256 A | | 10/1996 | Wolman et al. |
| 5,660,341 A | | 8/1997 | Perkins et al. |
| 5,803,378 A | | 9/1998 | Wolters |
| D409,453 S | | 5/1999 | Blaise |
| 6,244,529 B1 | | 6/2001 | Tardif et al. |
| 6,464,156 B1 | * | 10/2002 | Wexell ............. 241/93 |
| D493,074 S | | 7/2004 | Brousseau |
| 6,766,972 B1 | | 7/2004 | Prommel et al. |
| 6,915,973 B2 | | 7/2005 | So |
| 2004/0079820 A1 | | 4/2004 | So |

FOREIGN PATENT DOCUMENTS

| | | |
|---|---|---|
| CN | Y-2212450 | 11/1995 |
| CN | Y-2517491 | 10/2002 |
| CN | A-1498684 | 5/2004 |

OTHER PUBLICATIONS

"Bodum Swirl Garlic Slicer" No. 6761-01.

* cited by examiner

*Primary Examiner*—Faye Francis
(74) *Attorney, Agent, or Firm*—Barnes & Thornburg LLP; Timothy J. Engling

(57) ABSTRACT

A hand-held device for reducing the size of food items, for example by slicing or grating. The disclosed device has a slicing drum transversally inserted into an aperture on a lateral wall of a casing. Preferably, both the drum and its size reducing members, such as blades, are removable. Ideally, the drum can be inserted in an aperture on either of two opposing lateral walls so that the device may be easily used by both right-handed and left-handed people. A slicing compartment is formed by the casing and the slicing drum. A grip handle extends from the casing and preferably has an arm cover, which may open to a storage receptacle intended for storage of additional blades. The slicing drum is engaged with a crank lever assembly for rotation. A distal wall of the casing is preferably curved to form a tangential relationship with the slicing drum to, along with gravitational force, advance a food item to be reduced in size.

8 Claims, 6 Drawing Sheets

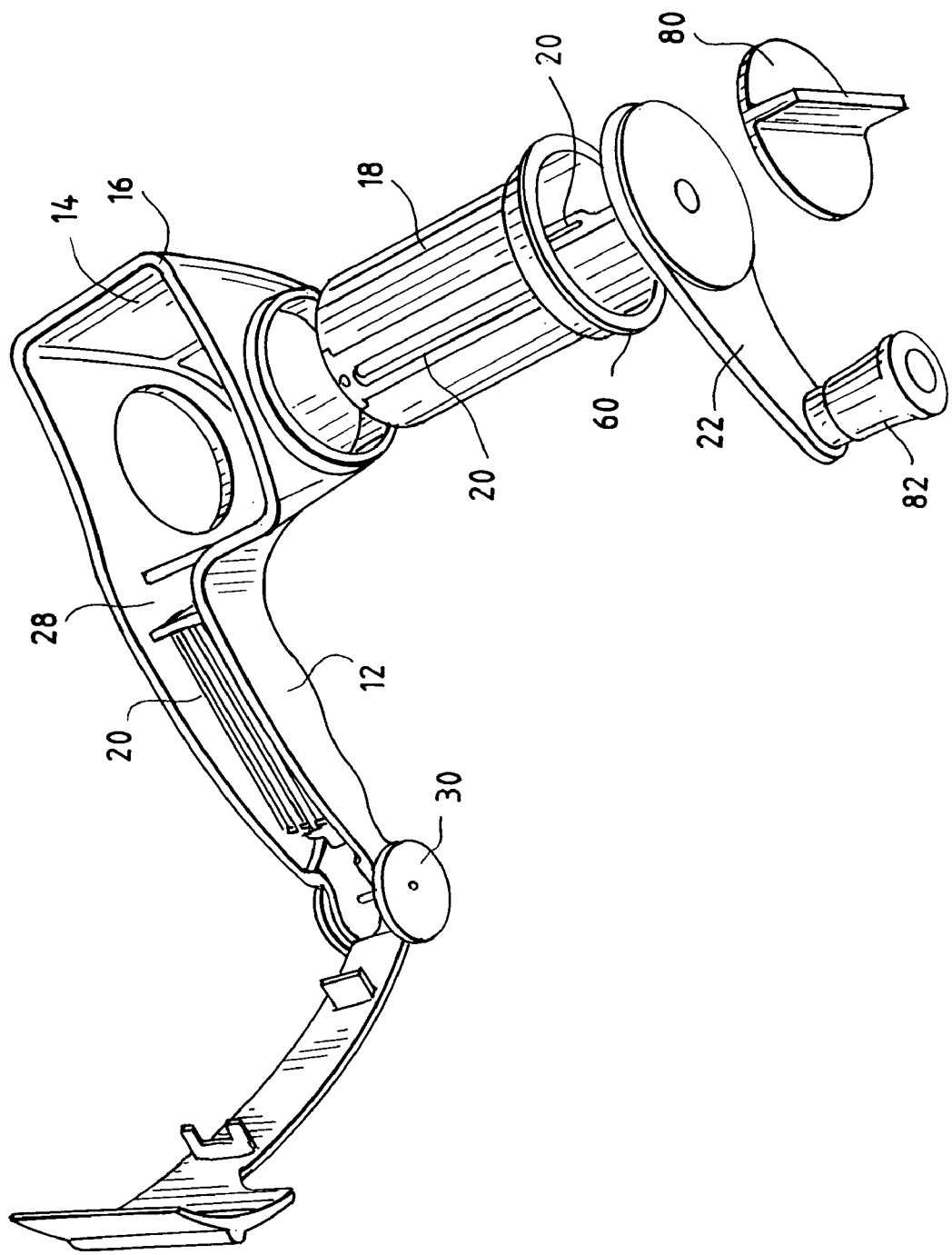

FOOD SLICING DEVICE

BACKGROUND

The present disclosure includes a hand-held device and a method for reducing the size of food items. More particularly, the disclosure relates to a hand-held device having a slicing compartment formed by a portion of a casing and a rotating slicing drum, which is preferably removable and reversible with removable blades.

Devices that reduce the size of food include mechanisms for grating, slicing and chopping for items such as cheese, garlic, ginger, pepper, onions and the like by using blades and graters. Such items are useful in simplifying food preparation. However, such items are often inconvenient as they require the food item to be of a particular size to be engaged in the slicing or grating mechanism.

The terms "size reducing mechanism" as used in this disclosure generally refer to slicing and grating devices, and the term "size reducing member" refers to slicing items such as blades, graters and cutting edges.

Food slicing and grating items are known in the art. U.S. Design Pat. D276,202 shows an ornamental design for a slicer/grater. It has a rotating handle attached to a cylindrical drum that slices or grates items in the compartment. The compartment does not have a curved wall in such a way that the curves of the drum and the curved wall of the compartment are tangential.

U.S. Design Pat. D493,074 shows an ornamental design for a grater. It has a rotating handle attached to a cylindrical drum that grates items in the grating case. The case does not have a curved wall in such a way that the curves of the drum and the curved wall of the case are tangential. It has a pressure arm pivotally incorporated into the handle.

U.S. Pat. No. 5,660,341 discloses a rotary grater. It has a handle attached to a rotating cylindrical drum that grates items in the compartment. The compartment has a curved wall wherein the lateral walls curve toward each other. It has a pressure arm as part of the handle with a pressure plate that fits between the curved walls.

U.S. Pat. No. 6,244,529 discloses a garlic grater with a perforated rotating drum connected to a handle that fits in a cavity. It has a tapered lip and a door that can be pivotally mounted on the casing.

U.S. Pat. No. 6,766,972 discloses a rotary grater with a handle attached to a rotating cylindrical drum that grates items in the grating compartment. It has a pressure arm pivotally attached to the handle with a curved pressure plate to force the items into the grating drum.

U.S. Publication 2004/0079820 discloses a rotary grater with a handle attached to a rotating cylindrical drum that grates items in the grating compartment. It has a pressure arm pivotally attached to the handle with a curved pressure plate that pivots to different positions to hold various items in the drum.

The prior art shows a food slicer with a slicing compartment, which is formed by a rotating slicing drum and a wall of a case. Items known in the prior art do not have an option of changing the size reducing mechanism, such as a rotating cylinder or drum, and/or the blades, slicers, graters and cutting edges, and such devices further do not provide convenient storage for different blades or graters when they are not in use. The prior art does not disclose a structure for readily removing the rotating cylinder and the cutting blades. Thus, it is desirable to produce a device with improvements over the prior art that will be apparent in the detailed description of the disclosure.

SUMMARY

The disclosure is a hand-held device that reduces the size of food items, preferably by slicing and possibly by grating, without requiring the food item to be of a particular size. The food items may include but are not limited to garlic, ginger, onions, cilantro, cheese, peppers and the like, which normally require slicing or grating prior to use in preparing food.

The present disclosure describes a removable slicing drum upon which removable size reducing members, such as blades, are mounted. In addition, the hand-held device may provide storage for multiple removable size reducing members, i.e. blades or graters, which are not in use and may be used with the device. A crank lever can be engaged to rotate the slicing drum for slicing or grating items in the slicing compartment, and preferably the crank lever can be changed to either side of the case so the device may be easily used by both right-handed and left-handed people.

Generally, the present disclosure details a hand-held device having a casing, with apertures in opposing lateral walls of the casing through which a cylindrical slicing drum with removable size reducing members is mounted. An arm, for handling by a consumer, extends from the casing and preferably has an arm cover, which opens to a storage receptacle intended for storage of additional removable size reducing members.

Preferably, a curved distal wall of the casing and the rotating slicing drum are tangentially related, so along with gravitational force, they advance a food item to be reduced in size, when engaging a crank lever generates rotation of the slicing drum to reduce the size of a food item inserted adjacent to the drum.

As an example, the disclosure could cover a hand-held garlic slicer that is adapted to slice items by rotating a crank lever attached to a rotating cylindrical drum having blades that slice items in the slicing compartment. Garlic cloves do not have to be cut into certain sizes and secured each time they are sliced. With the present disclosure, cloves of various sizes can be dropped into the slicing compartment, which is formed by a slicing drum and a curved wall of the casing in such a way that the curves of the drum and the curved wall of the casing are tangential. The gravitational force and the rotation of the slicing drum advance the cloves into a trapped position that allows the cutting blades on the drum to cut them down. The space left by the cloves that have been made smaller will automatically be filled by any remaining cloves in the casing, or an optional magazine can additionally hold more garlic cloves for continuous slicing. The drum can have one or more cutting blades mounted on the drum surface such that they can be disassembled and taken out to be cleaned or replaced. An optional feature may be different types of blades that may cut cloves to different thicknesses or into thin strips. The garlic slices are dispensed from the slicing drum after rotation. Although a compartment formed by a rotating slicing drum and a wall of a case has been used with graters, the features for a hand-held food slicing device are particularly novel for a slicer or a julienne device.

BRIEF DESCRIPTION OF THE DRAWING

The features of this disclosure and the manner of obtaining them will become more apparent, and the disclosure itself will be best understood by reference to the following description of embodiments of the food item reducing device taken in conjunction with the accompanying drawings in which:

FIG. 7 shows a perspective view of a disassembled embodiment.

DETAILED DESCRIPTION

While the present invention will be fully described hereinafter with reference to the accompanying drawings, in which particular embodiments are shown, it is to be understood at the outset that persons skilled in the art may modify the embodiments disclosed herein while still achieving the desired result. Accordingly, the description that follows is to be understood as a broad informative disclosure directed to persons skilled in the appropriate art and not as limitations of the present disclosure.

Figure 1:
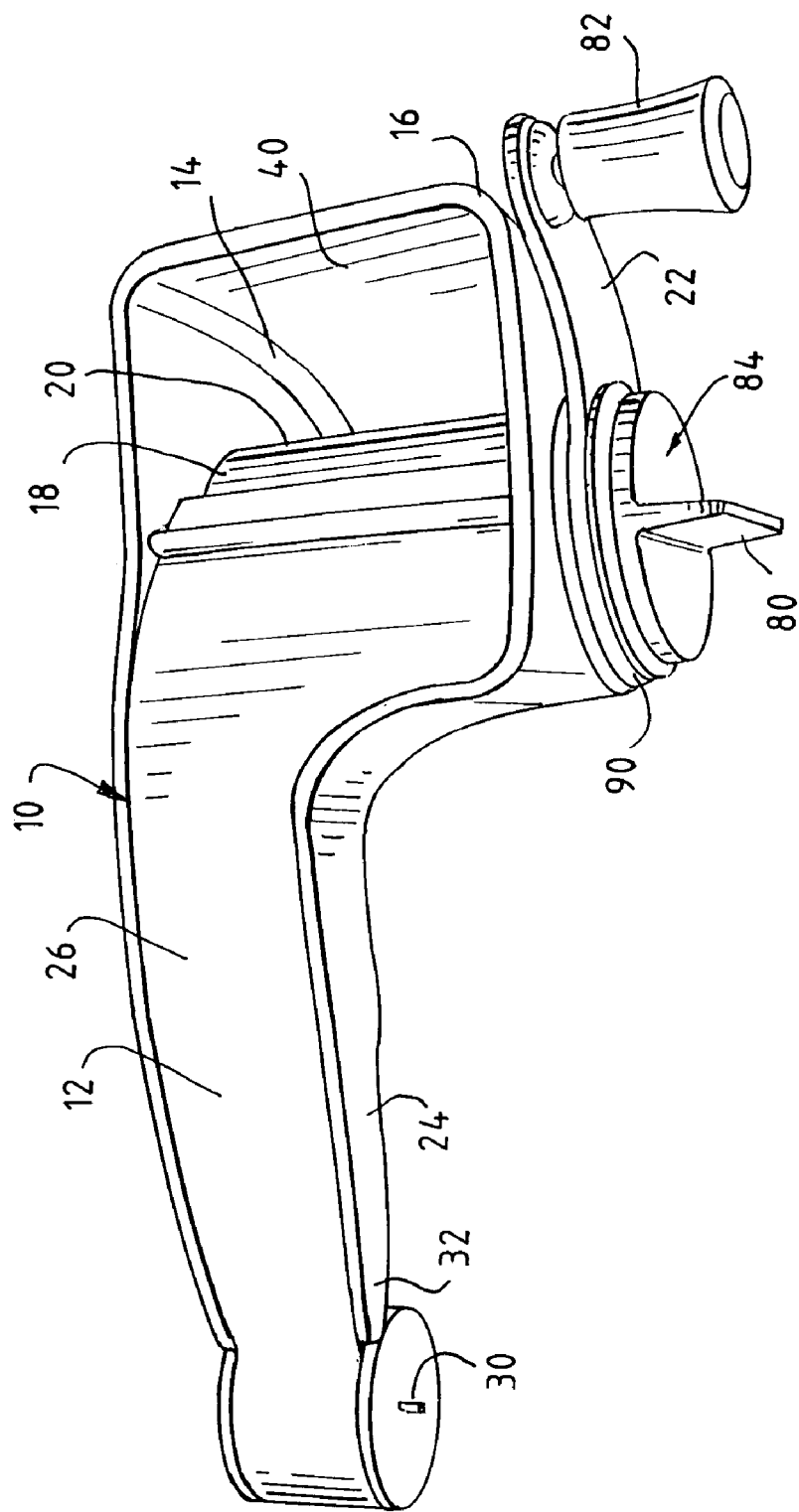
FIG. 1 shows a perspective view of an assembled embodiment.

The food reducing device 10 is intended to be hand-held by the user with a grip handle 12. FIG. 1 shows an assembled embodiment of a food reducing device 10 having a grip handle 12, a slicing compartment 14 inside a casing 16, a rotating cylindrical drum 18 having size reducing member 20 that slices or grates food items in the slicing compartment 14. A crank lever 22 can be engaged to rotate the cylindrical drum 18 for slicing or grating food items.

Figure 4:
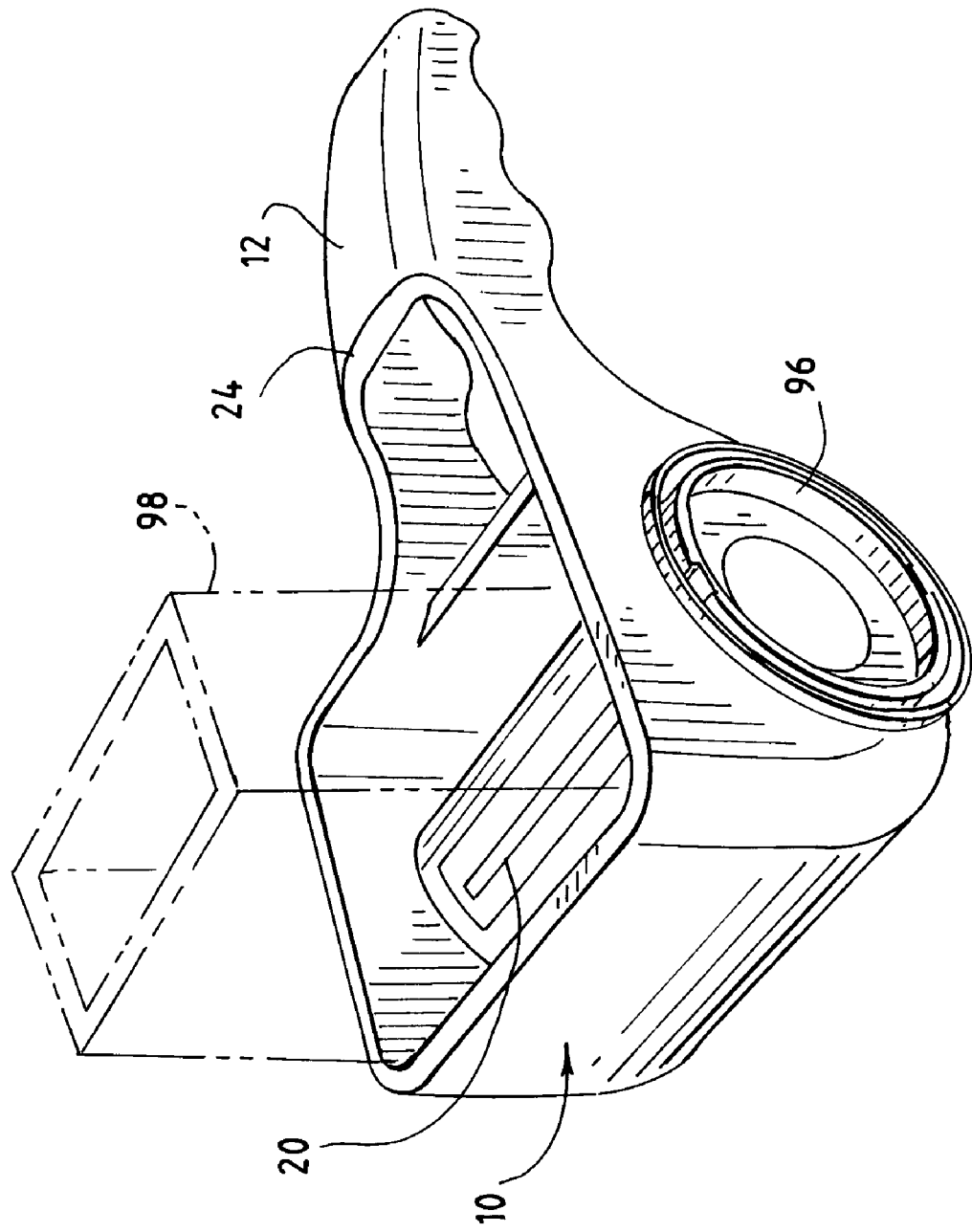
FIG. 4 shows an embodiment with an optional magazine.
Figure 5:
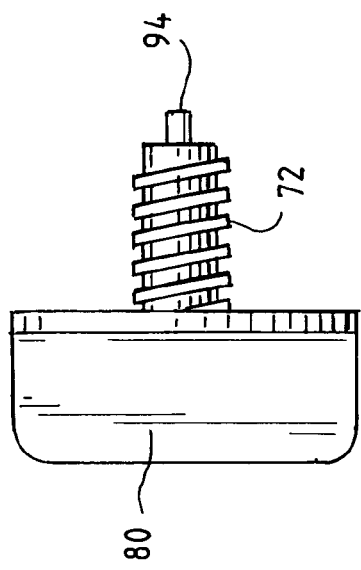
FIG. 5 shows one style of a fastener.
Figure 6:
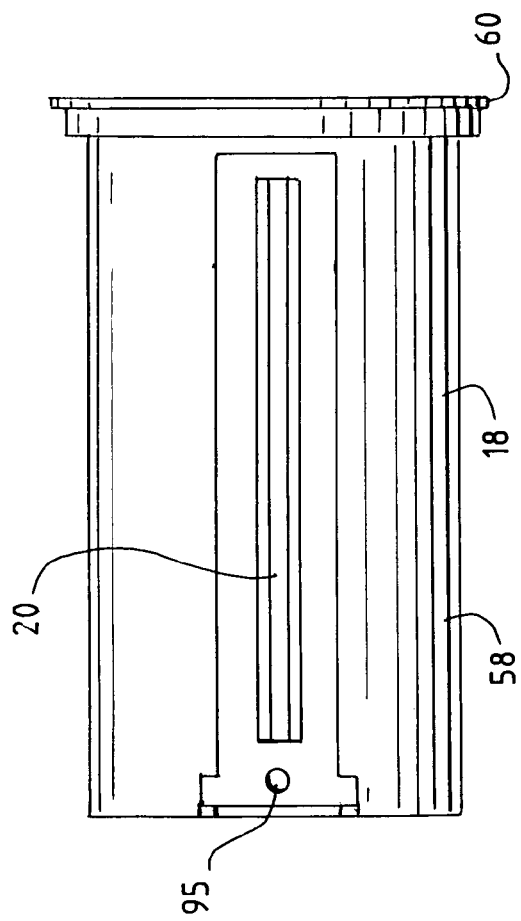
FIG. 6 shows one style of a drum.

The grip handle 12 may be an arm 24 as shown in FIG. 4, or the grip handle 12 may have an arm cover 26, which may form a storage receptacle 28. The arm 24 is shown extending from the casing 16, and it may be laterally oriented on either side or may also be medially oriented to the casing 16. A medial orientation may be conducive to a making the hand-held device 10 convenient for use by either a right-handed or left-handed person.

In a preferred embodiment with an arm cover 26, the arm cover 26 may be pivotally attached to the arm 24. FIG. 1 also shows the optional arm cover 26 pivotally connected by a pivoting means 30, such as a pin, preferably to the distal end 32 of the arm 24. It is to be understood that the arm cover 26 may also be connected to the arm 24 by other means known in the art, such as hingedly or other methods of attachment. The arm cover 26 may also open in any direction on the device 10 and may be connected to either the lateral sides of the arm 24.

Figure 2:
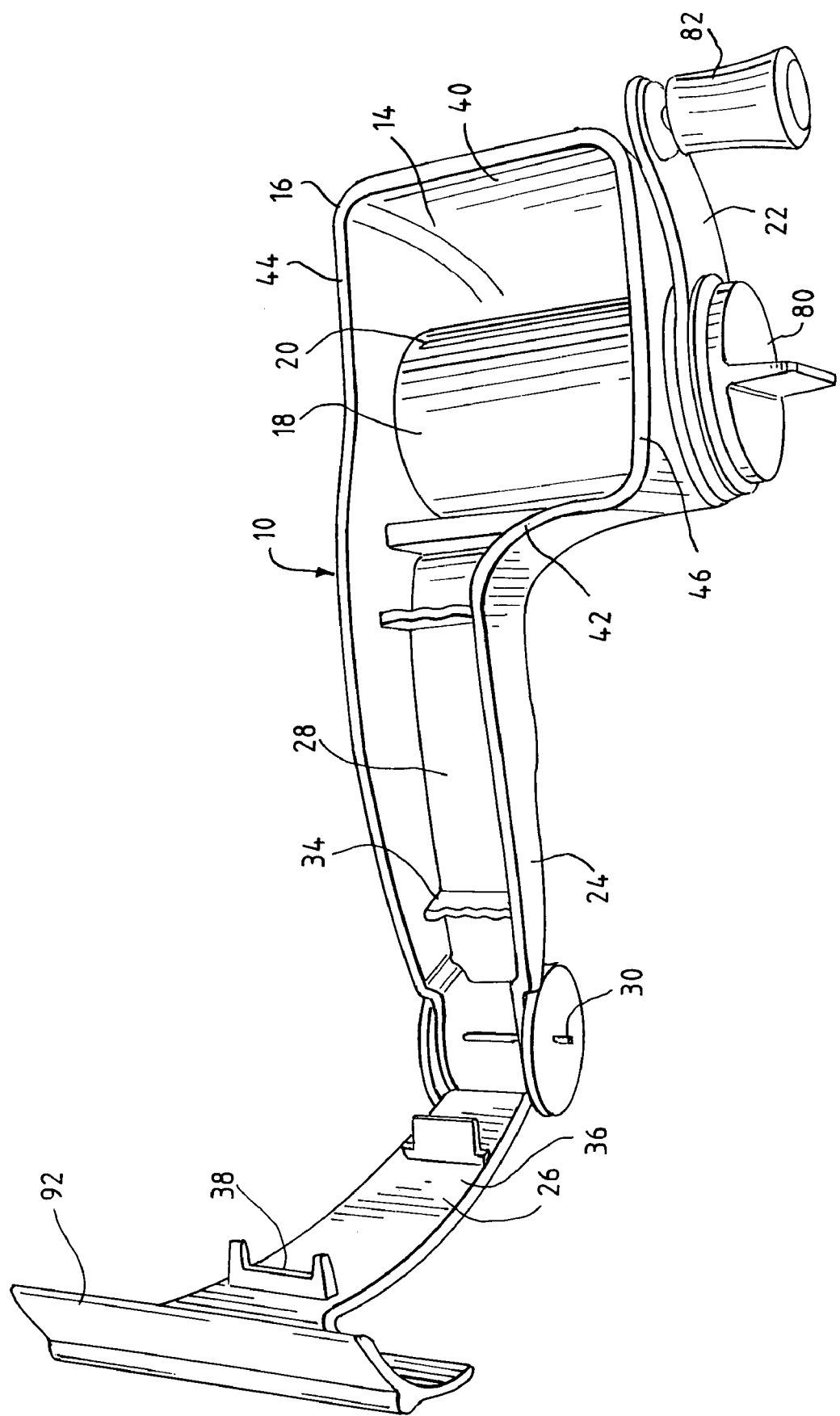
FIG. 2 shows a perspective view with a lifted arm cover.
Figure 3:
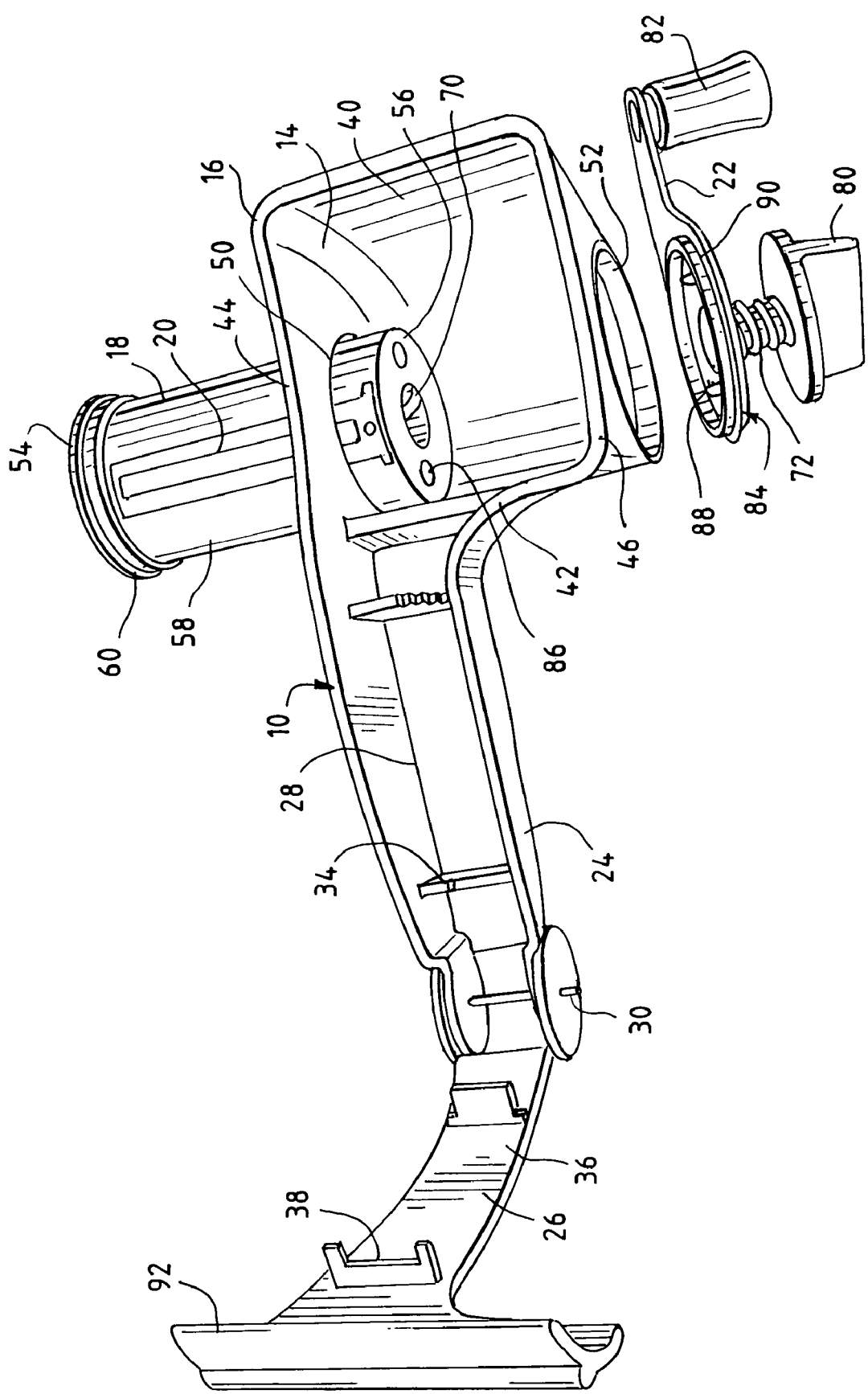
FIG. 3 shows a perspective view of a partially disassembled embodiment.

In a preferred embodiment, the arm 24 may have a means 34 for holding size reducing members 20, such as the blade holder shown in FIGS. 2 and 3. The means 34 for holding size reducing members 20 may include a receptacle, bin, container, clasp, holder, box, sleeve, stirrup, hoop, chamber, repository or sheath. Also, the inner surface 36 of the arm cover 26 may include a support 38 used in association with the means 34 for holding size reducing members 20 to assist in securing any size reducing members 20 that are being stored in the arm 24. The means 34 for holding size reducing members 20 provides a convenient place to hold additional or other size reducing members 20 with different functions or features.

FIG. 2 shows an embodiment of the device 10 with the arm cover 26 in an open position. This reveals an optional storage receptacle 28 located in the arm 24 of the device 10.

The storage receptacle 28 may be used to store removable size reducing members 20 that are not in use, for example removable blades or graters, which are mountable on the rotating cylindrical drum 18. The arm cover 26 may closed, as shown in FIG. 1, to enclose size reducing members 20 that are not in use.

The slicing compartment 14 is preferably formed between the rotating cylindrical drum 18 and the distal wall 40 of the casing 16. The slicing compartment 14 is between the walls 40, 42, 44 and 46 of the casing 16. The distal wall 40 of the casing 16 preferably curves in such a way that the curves of the drum 18 and the curved wall 40 of the casing 16 are tangential. The preferred curved distal wall 40 assists in directing food items to the size reducing member 20 for cutting or grating. The proximal wall 42 preferably has the arm 24 extending from it, and the rotating cylindrical drum 18 may effectively block the proximal wall 42 from the items to be sliced. A first lateral wall 44 has a first aperture 50, and a second lateral wall 46 has a second aperture 52.

FIG. 2 shows the slicing compartment 14 that is formed by the tangential relationship of the curve of the distal wall 40 and the drum 18. This tangential relationship and gravitational force provides an advantage of the present device 10 in advancing a food item into a trapped position easily accessible to a rotating size reducing member 20, when the crank lever 22 is rotated, that allows for the size reducing member 20 to effectively reduce the size of the food item.

The drum 18 is connected to the casing 16 through the apertures 50 and 52. The size reducing member 20 is mounted on the curved surface 58 of the cylindrical drum 18 between the lateral sides 54 and 56 of the cylindrical drum 18. Ideally, the drum 18 is removable through an aperture 50 or 52. A preferred removable drum 18 on a first lateral side 54 has a rim 60, which engages an aperture (as shown 50) when inserted to help secure the removable drum 18 with the first lateral wall 44.

A second lateral side 56 of a preferred removable drum 18 includes an internally incised hub 70 for engaging a spirally threaded rod 72 of a fastener 80, which also holds the crank lever 22 to the casing 16. The fastener 80 and the crank lever 22 with an optional knob 82 make a crank assembly 84. The crank lever 22 also has a crank handle rim 90 that secures the crank lever 22 to a lateral wall (46 as shown) of the casing 16 and prevents the crank lever 22 from traversing the aperture (52 as shown).

A preferred removable drum 18 also has a receptacle 86 in the second lateral side 56 for receiving a complementary protrusion 88 on the crank lever 22. Multiple receptacles 86 and complementary protrusions 88 are preferred, and the term "receptacle" is broadly meant to cover any type of recess, hole, seat, or slot. The receptacle 86 and complementary protrusion 88 when engaged along with the threaded rod 72 drive the rotation of the drum 18.

Further, FIG. 3 shows a disassembled view of an embodiment of the device 10 with a removable drum 18 transversely insertable into the apertures 50 and 52 of the lateral walls 44 and 46, respectively. A preferred removable drum 18 may be inserted into casing 16 through either aperture 50 or aperture 52 in either of two opposing lateral walls 44 and 46 so that the device 10 may be easily used by both right-handed and left-handed people.

The size reducing member 20 is preferably also removable. The preferred removable size reducing member 20 is slidably mounted on the curved surface 58 of the removable drum 18, such as the removable blade shown in FIG. 3 that slides away from the rim 60. One or more size reducing members 20 may be slidably mounted around a removable drum 18 on its surface 58. For example, two or more sets of slidably mounted blades and/or graters may be used, which would allow for faster and more efficient reduction of size of food items. Removable size reducing members 20 allow for insertion of size reducing members 20 with different features, such as slicing, cutting julienne-style, or grating or the thickness of the slice. The blades or graters may be of different sizes and thicknesses or for different purposes. Also, the size reducing member 20 and rotating cylindrical drum 18 may be more easily cleaned if disassembled.

A lip 92 of the distal end of the arm cover 26 can participate in reducing food by assisting in advancing the food item to the rotating cylindrical drum 18. The lip 92 may be used by itself or with an attachment to secure or drive food items into the slicing compartment 14.

The fastener 80 may have a tab 94, such as on the end of threaded rod 72, to assist in the removal of a size reducing member 20, which may have a complementary clasp or grasp aperture 95.

FIG. 4 shows an embodiment of the device 10 showing the drum opening 96 of a rotating cylindrical drum 18, through which food is dispensed after being reduced in size. In addition, an optional magazine 98 may be used in association with the casing 16 to provide an additional supply of food items.

Another optional feature is to potentially add a bracket or other means to mount the hand-held device. A mount would allow the user's hand normally used with a grip handle 12 to be used for feeding food items into the slicing compartment 14.

The general method of using the disclosed device is performed by placing a food item in the slicing compartment 14 and rotating the crank lever 22. Rotating the cylindrical drum 18 can reduce the size of the food item inside the slicing compartment 14 as the size reducing member 20 slices into the food item.

Although preferred embodiments of the disclosure are illustrated and described in connection with particular features, it can be adapted for use with a wide variety of food size reducing devices, slicers and graters. Other embodiments and equivalent devices of slicers and graters are envisioned within the scope of the claims. Various features of the disclosure have been particularly shown and described in connection with illustrated embodiments. However, it must be understood that the particular embodiments merely illustrate and that the invention is to be given its fullest interpretation within the terms of the claims.

What is claimed is:

1. A hand-held device for reducing size of food items comprising:
    a casing having a first lateral wall with an aperture, a second lateral wall with an aperture, a distal wall, and a proximal wall;
    an arm extending from the proximal wall;
    a rotatable cylindrical drum associated with the apertures of the lateral walls;
    a size reducing member insertable on a surface of the rotatable cylindrical drum;
    a storage receptacle inside the arm capable of securing the size reducing member; and
    a crank lever attached to the rotatable cylindrical drum for rotating the cylindrical drum;
    an arm cover that is pivotally attached to the arm wherein the arm cover completely encloses the storage receptacle and an inner surface of the arm cover includes a support to assist in securing the size reducing member being stored in the arm,
    wherein a slicing compartment is formed between the curved distal wall and the rotatable cylindrical drum.

2. The hand held device of claim 1 wherein the distal wall of the casing is concave and tangential with a convex curve of the rotatable cylindrical drum.

3. The hand-held device of claim 1 wherein the size reducing member is slidably mounted on the rotatable cylindrical drum so that a cutting edge of the size reducing member faces forward toward the distal wall while in the slicing compartment.

4. The hand-held device of claim 1 wherein the size reducing member is a removable blade that can be inserted into the rotatable cylindrical drum with a cutting edge facing in either direction.

5. The hand-held device of claim 1 including a plurality of different removable size reducing members.

6. The hand-held device of claim 1 further comprising a fastener having a spirally threaded rod to secure the crank lever having a protrusion to the casing, the rotatable cylindrical drum having a first lateral side and a second lateral side, the first lateral side having a rim that engages one of the apertures, the second lateral side including an internally incised hub for engaging the spirally threaded rod and a receptacle for receiving the protrusion of the crank lever.

7. A hand-held device for reducing size of food items comprising:
    a casing having a first lateral wall with a first aperture, a second lateral wall with a second aperture the same size as the first aperture, a curved distal wall, and a proximal wall;
    an arm extending from the proximal wall;
    an arm cover pivotally attached to the arm;
    a rotatable cylindrical drum associated with the apertures of the lateral walls;
    a size reducing member insertable on a surface of the rotatable cylindrical drum; the size reducing member selected from the group consisting of a blade or grater;
    a storage receptacle inside the arm capable of securing the size reducing member; and
    a crank lever attached to the rotatable cylindrical drum for rotating the cylindrical drum,
    wherein a slicing compartment is formed between the curved distal wall and the rotatable cylindrical drum and wherein the rotatable cylindrical drum insertable in either aperture,
    wherein the arm cover completely encloses the storage receptacle and an inner surface of the arm cover includes a support to assist in securing the size reducing member being stored in the arm, and
    wherein the crank lever can be changed to either side of the casing so the device may be used by both right-handed and left-handed people.

8. The hand-held device of claim 7 further comprising a fastener having a spirally threaded rod to secure the crank lever having a protrusion to the casing, the rotatable cylindrical drum having a first lateral side and a second lateral side, the first lateral side having a rim that engages one of the apertures, the second lateral side including an internally incised hub for engaging the spirally threaded rod and a receptacle for receiving the protrusion of the crank lever.

* * * * *